Figure 1:
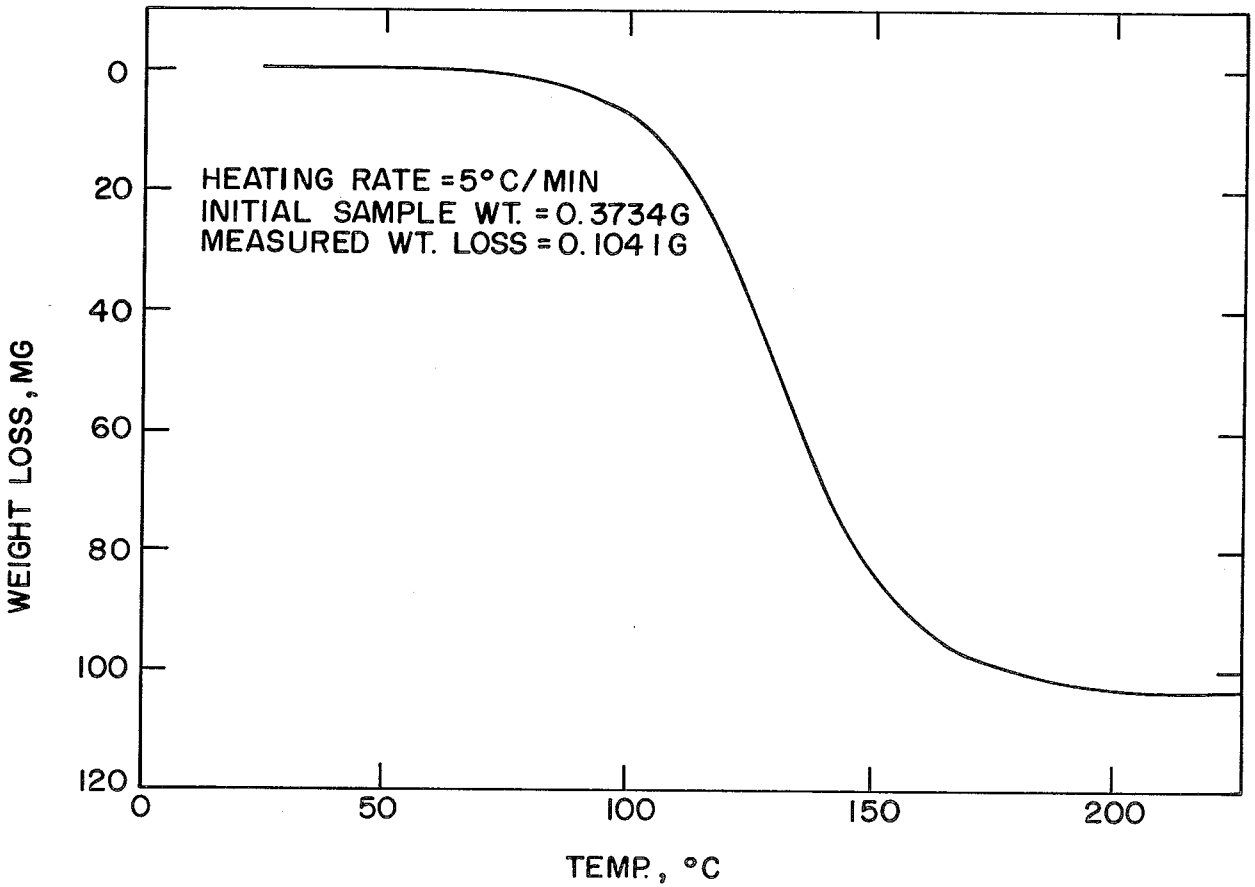
Figure 2:
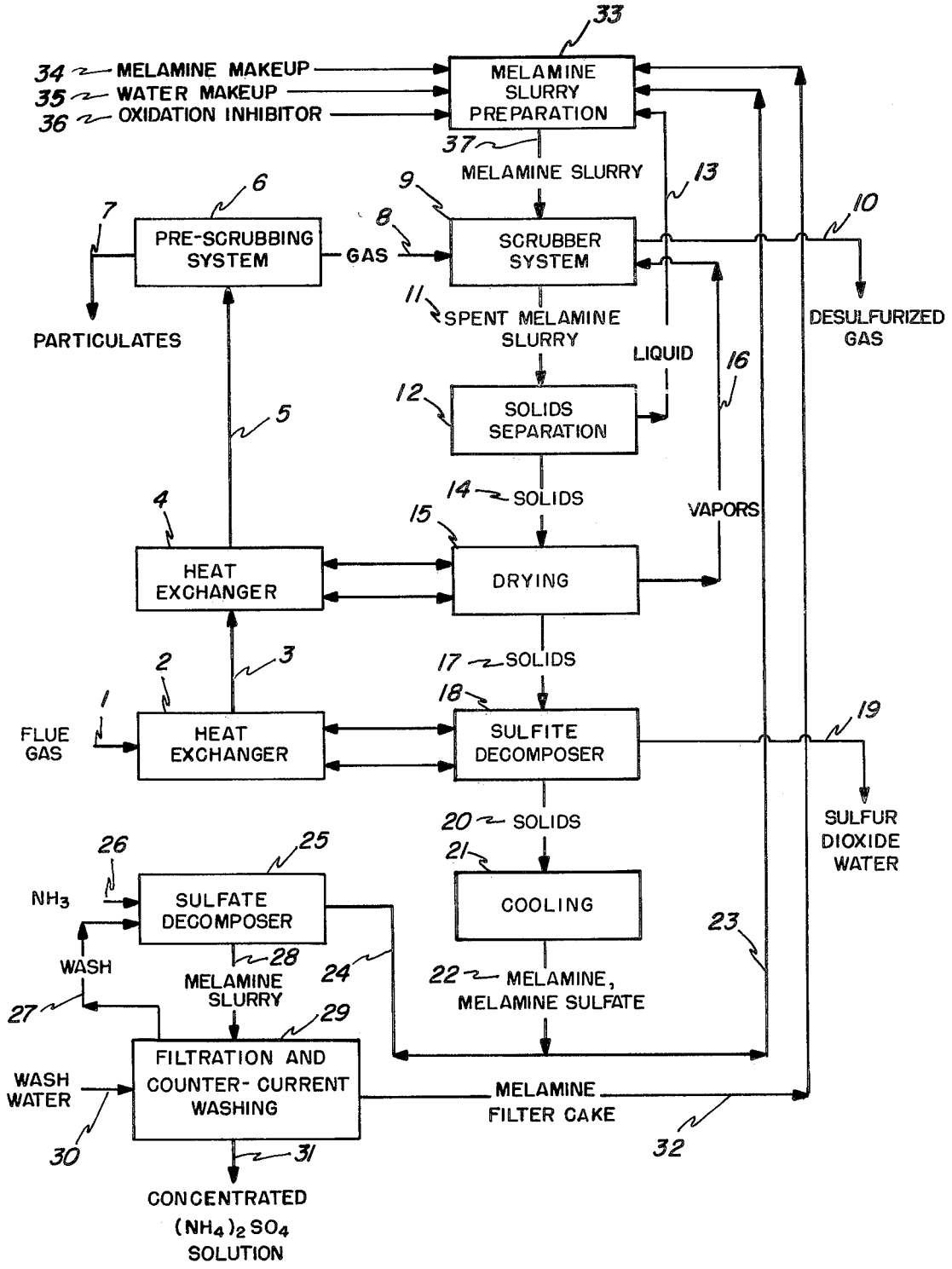

United States Defensive Publication [19] (H) [11] T970,008

Kohler et al. [43] May 2, 1978

[54] REMOVAL AND RECOVERY OF SULFUR OXIDES FROM GAS STREAMS WITH MELAMINE

[75] Inventors: John J. Kohler, Florence; Joe Gautney, Sheffield; Yong K. Kim; John F. McCullough, both of Florence, all of Ala.

[73] Assignee: Tennessee Valley Authority

[21] Appl. No.: 794,269

[22] Filed: May 5, 1977

[51] Int. Cl.[2] ..... C01B 7/00

[52] U.S. Cl. ..... 423/243

[57] ABSTRACT

A process for the removal and recovery of sulfur oxides from gas streams by contacting the gas stream with an aqueous suspension of melamine containing an oxidation inhibitor such as para-phenylenediamine whereupon a mixture of solid, hydrated melamine sulfites and solid, hydrated melamine sulfate is formed. The solids are then separated from the reaction product and the clarified liquid recycled. The solids are then heated to temperatures up to 200° C to decompose the hydrated melamine sulfites into free melamine, gaseous water, and sulfur dioxide, and the gaseous water and sulfur dioxide withdrawn as product. The hot solids are cooled and split into two portions. One portion is recycled and the other portion is treated with an aqueous inorganic base stronger than melamine such as ammonia or potassium hydroxide to decompose the contained melamine sulfate into free melamine and a basic sulfate salt solution. The basic sulfate salt solution is separated from the melamine and withdrawn as product and the melamine is recycled to the process.

4 Claims, 2 Sheets Drawing,

56 Pages Specification

The file of this unexamined application may be inspected and copies thereof may be purchased (849 O.G. 1221, Apr. 9, 1968).

THERMAL DECOMPOSITION OF $(C_3H_6N_6)_2 \cdot H_2SO_3$